United States Patent
Klein et al.

(10) Patent No.: US 9,317,711 B2
(45) Date of Patent: Apr. 19, 2016

(54) PRIVACY RESTRICTIONS FOR COLUMNAR STORAGE

(71) Applicants: Udo Klein, Walldorf (DE); Jens Odenheimer, Walldorf (DE)

(72) Inventors: Udo Klein, Walldorf (DE); Jens Odenheimer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/314,046

(22) Filed: Jun. 25, 2014

(65) Prior Publication Data

US 2015/0379299 A1    Dec. 31, 2015

(51) Int. Cl.
  *G06F 21/10* (2013.01)
  *G06F 21/62* (2013.01)
  *G06F 21/60* (2013.01)

(52) U.S. Cl.
  CPC .......... *G06F 21/6227* (2013.01); *G06F 21/602* (2013.01); *G06F 21/6245* (2013.01)

(58) Field of Classification Search
  CPC ....................................................... G06F 21/10
  See application file for complete search history.

(56) References Cited

U.S. PATENT DOCUMENTS

| | | | |
|---|---|---|---|
| 7,437,763 B2* | 10/2008 | Guo | 726/25 |
| 8,218,761 B2* | 7/2012 | Lee et al. | 380/46 |
| 2004/0139043 A1* | 7/2004 | Lei et al. | 707/1 |
| 2008/0005658 A1* | 1/2008 | Benhase et al. | 715/509 |

* cited by examiner

*Primary Examiner* — Kambiz Zand
*Assistant Examiner* — Thanh Le (57) ABSTRACT

In privacy restrictions for columnar storage, a query including operations on one or more protected columns is received. The one or more protected columns are specified with one or more access restricting metadata in a columnar table. It is determined whether the received query comprises operations on the one or more protected columns specified with the one or more access restricting metadata. The execution of the query is restricted and a constraint violation is displayed, based on the determination.

18 Claims, 8 Drawing Sheets

500

TABLE A

| NAME 510 | AGE 520 | ADDRESS 530 | RANDOM KEY 540 |
|---|---|---|---|
| USER A | 34 | ADDRESS 1 | X 555 |
| USER B | 22 | ADDRESS 2 | Y |
| USER C | 67 | ADDRESS 3 | V |
| USER D | 55 | ADDRESS 4 | Z |
| ... | ... | ... | ... |

TABLE B

| RANDOM KEY 540 | ENCRYPTED VALUE 550 |
|---|---|
| X 555 | WPX12ER 560 |
| Y | TQD45YU |
| V | NM66KL |
| Z | MN90BV |
| ... | ... |

| NAME 110 | AGE 120 | ADDRESS 130 | PASSPORT NUMBER 140 |
|---|---|---|---|
| USER A | 34 | ADDRESS 1 | 34886544 |
| USER B | 22 | ADDRESS 2 | 3571113 |
| USER C | 67 | ADDRESS 3 | 4012188 |
| USER D | 55 | ADDRESS 4 | 4385677 |

SAMPLE 100

TABLE A

| NAME 510 | AGE 520 | ADDRESS 530 | RANDOM KEY 540 |
|---|---|---|---|
| USER A | 34 | ADDRESS 1 | X 555 |
| USER B | 22 | ADDRESS 2 | Y |
| USER C | 67 | ADDRESS 3 | V |
| USER D | 55 | ADDRESS 4 | Z |
| ... | ... | ... | ... |

TABLE B

| RANDOM KEY 540 | ENCRYPTED VALUE 550 |
|---|---|
| X 555 | WPX12ER 560 |
| Y | TQD45YU |
| V | NM66KL |
| Z | MN90BV |
| ... | ... |

PRIVACY RESTRICTIONS FOR COLUMNAR STORAGE

BACKGROUND

In some jurisdictions, storage of protected data such as personal data or sensitive data is strictly governed. Not only the storage, but also processing of such protected data is regulated. Typically, in a traditional database such as a relational database, searching is prevented on the protected data by not adding indexes on columns of such protected data. However, in columnar storage this is a challenging task because of the way data is organized and stored.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for privacy restrictions for columnar storage are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
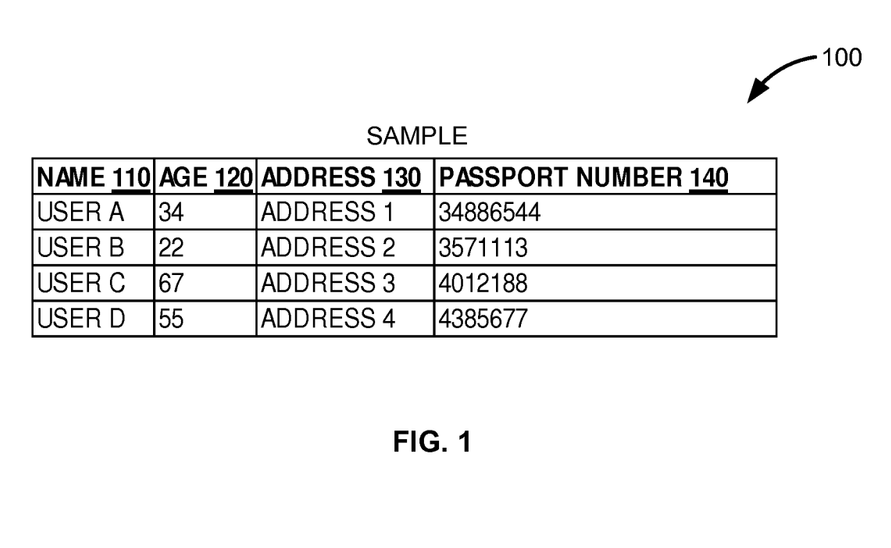
FIG. 1 illustrates a table with protected data, according to one embodiment.

FIG. 1 illustrates table 100 with protected data, according to one embodiment. The table 100 named 'SAMPLE' as shown contain columns such as 'NAME' 110, 'AGE' 120, 'ADDRESS' 130 and 'PASSPORT_NUMBER' 140. The column passport number 140 has passport numbers of individual users, where the passport number is protected data. Accordingly, the column passport number 140 is referred to as a protected column For example, for a specific jurisdiction, storing of such passport numbers is permissible, whereas, searching and processing of the passport numbers is not permissible based on the governing laws applicable in that jurisdiction. It is not permissible to search the protected data such as passport number, because, if passport number of one individual user is known, then an attacker can deduce the passport number of other individuals, e.g., by using malicious attacks, cross-referencing, etc.

In columnar storage, data in tables are stored by columns rather than by rows. For example, in the table 'SAMPLE' (100), values in the column 'NAME' 110 are stored first, values in the column 'AGE' 120 are stored next in consecutive memory locations, values in the column 'ADDRESS' 130 are stored next in consecutive memory locations, followed by the values in the column 'PASSPORT_NUMBER' 140. These stored values are intrinsically sorted so that contiguous values will be placed adjacent to each other in memory. Columnar storage allows highly efficient compression. Various compression methods, such as run-length encoding, cluster coding or dictionary coding can be used on such contiguous values.

Figure 2:
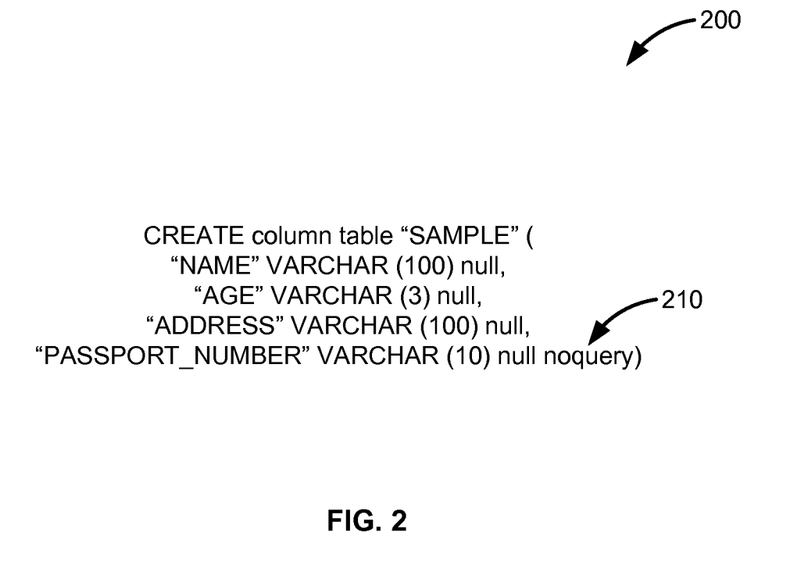
FIG. 2 shows a query language statement illustrating creation of a columnar table with protected column, according to one embodiment.

FIG. 2 shows a query language statement illustrating creation of a columnar table with protected column, according to one embodiment. Consider an example of a table named 'SAMPLE' that includes a key column 'NAME' of data type 'VARCHAR', a second column 'AGE' of data type 'VARCHAR', a third column 'ADDRESS' of data type 'VARCHAR' and a fourth column 'PASSPORT_NUMBER' of data type 'VARCHAR'. The fourth column 'PASSPORT_NUMBER' is a protected column because it contains protected data i.e. passport number of individuals. In order to restrict searching and processing on this protected column 'PASSPORT_NUMBER', an access restricting metadata is specified along with this protected column 'PASSPORT_NUMBER'. While creating the columnar table 'SAMPLE' access restricting metadata "noquery" is specified with the protected column 'PASSPORT_NUMBER'.

In the query language statement 200, the syntax to create the columnar table named 'SAMPLE' is specified along with the column attributes such as 'NAME', 'AGE', 'ADDRESS' and 'PASSPORT_NUMBER'. The 'PASSPORT_NUMBER' being a protected column, is specified with the access restricting metadata "noquery" 210. The implementation associated with the functionality of access restricting metadata is performed in a database catalog in a database such as in-memory database. The database catalog of the in-memory database includes metadata in which are stored definitions of the in-memory database objects such as base tables, views, indexes, etc. This implementation of access restricting metadata in the database catalog restricts any selection or any operation on the protected column 'PASSPORT_NUMBER'. Based on the execution of the query language statement 200, the columnar table 'SAMPLE' is created with the protected column 'PASSPORT_NUMBER'.

When a structured query language (SQL) query including operations on the protected column is received, the in-memory database may restrict or prevent execution of the query, and may return an error message. For example, consider receiving an SQL query for execution, SELECT*FROM sample WHERE name='USER A'

When this query is executed, all the details associated with name 'USER A' are retrieved and displayed except the protected data passport number. Consider another SQL query for execution, SELECT*FROM sample WHERE passport_number= '34886544'

Here, the 'WHERE' clause constraint is on the protected column 'PASSPORT_NUMBER', therefore, this query is prevented or restricted from being executed, and an error message "constraint violation" is returned and displayed on a user interface.

Consider another SQL query for execution with alias column names for 'NAME' and 'PASSPORT_NUMBER', SELECT t1.name as name, t2.passport_number as id
FROM sample t1, sample t2
WHERE t1.name=t2.name Though the protected column passport_number is specified with an alias as 'id', the in-memory database infers that 'id' refers to the protected column passport_number, and restricts execution of this query.

In one embodiment, database views generated from the columnar table 'SAMPLE' may inherit the protected column 'PASSPORT_NUMBER' specified with the access restricting metadata "noquery". Queries or operations performed on the protected column 'PASSPORT_NUMBER' in the database views are restricted, and error messages such as "constraint violation" may be returned and displayed on the user interface.

Figure 3:
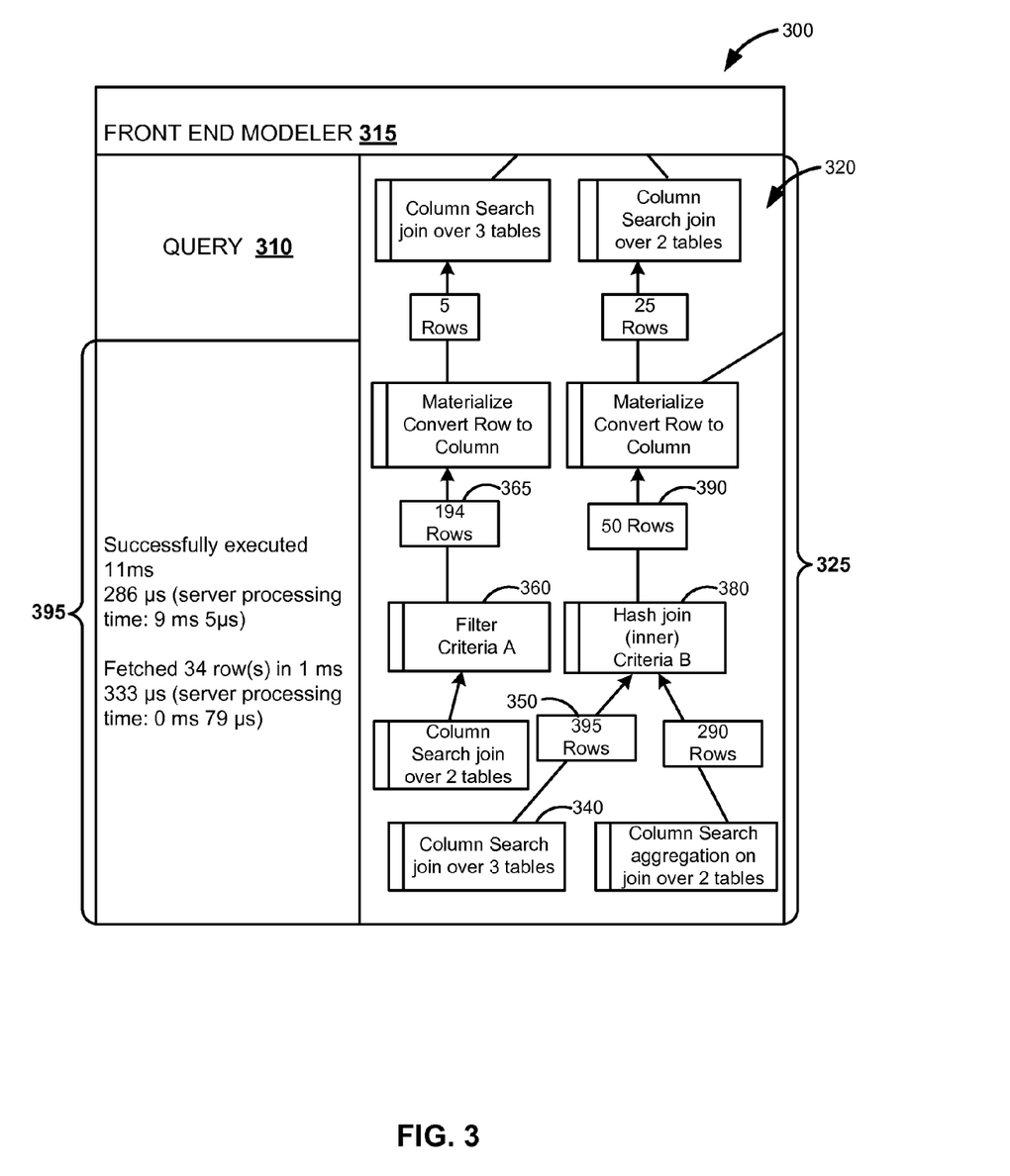
FIG. 3 is a block diagram illustrating a user interface displaying dataflow graph associated with a query, according to one embodiment.

FIG. 3 is a block diagram illustrating user interface (UI) 300 displaying dataflow graph associated with a query, according to one embodiment. For example, consider a query 310, where the query 310 is indicative of any query that may include various operations such as selection, filtering, joining, conversion, etc., on any columns of any tables in any database. In front end modeler 315, displayed on UI 300, a portion of dataflow graph 320 associated with this query can be visualized in window 325 of the UI 300 using a visualize plan option (not shown). The data flow graph is a graphical representation of the query 310, and the portion of this data flow graph 320 can be viewed in the window 325. Various individual operations constituting the query 310 are shown in the data flow graph 320. Individual operations in the data flow graph 320 may reference one or more tables.

For example, block 340 represents column search operation where three tables are joined, and this operation could result in 395 rows of data as shown in block 350. Block 360 represents a filter operation where data is filtered based on the specified criteria 'criteria A', and this operation could result in 194 rows of data as shown in block 365. Block 380 represents an inner join operation where the tables are joined based on the specified criteria 'criteria B', and this operation could result in 50 rows as shown in block 390. Blocks 340, 360 and 390 are merely exemplary, the query 310 may be associated with any number of blocks representing any operation. Similarly, all the individual operations associated with the query 310 can be visualized in the data flow graph 320.

When a complex query is received from a user involving operations on a protected column specified with access restricting metadata, the data flow graph associated with the complex query is automatically traversed to determine whether operations are performed on the protected column. When it is determined that an operation is performed on the protected column, the complex query is restricted from being executed, and an error message "constraint violation" may be displayed to the user. For example, a query including an operation to alter a protected column of a columnar table by removing the specified access restricting metadata is received. The data flow graph associated with this query is traversed, and it is determined that an operation to alter the protected column is included in the received query. In response to this determination, a security violation is automatically logged, and an automatic notification is sent to an administrator/ authorized user. Notification may include various channels such as an email, short message service, etc. Result of execution of the query 310 can be viewed in window 395 of the UI 300.

Figure 4:
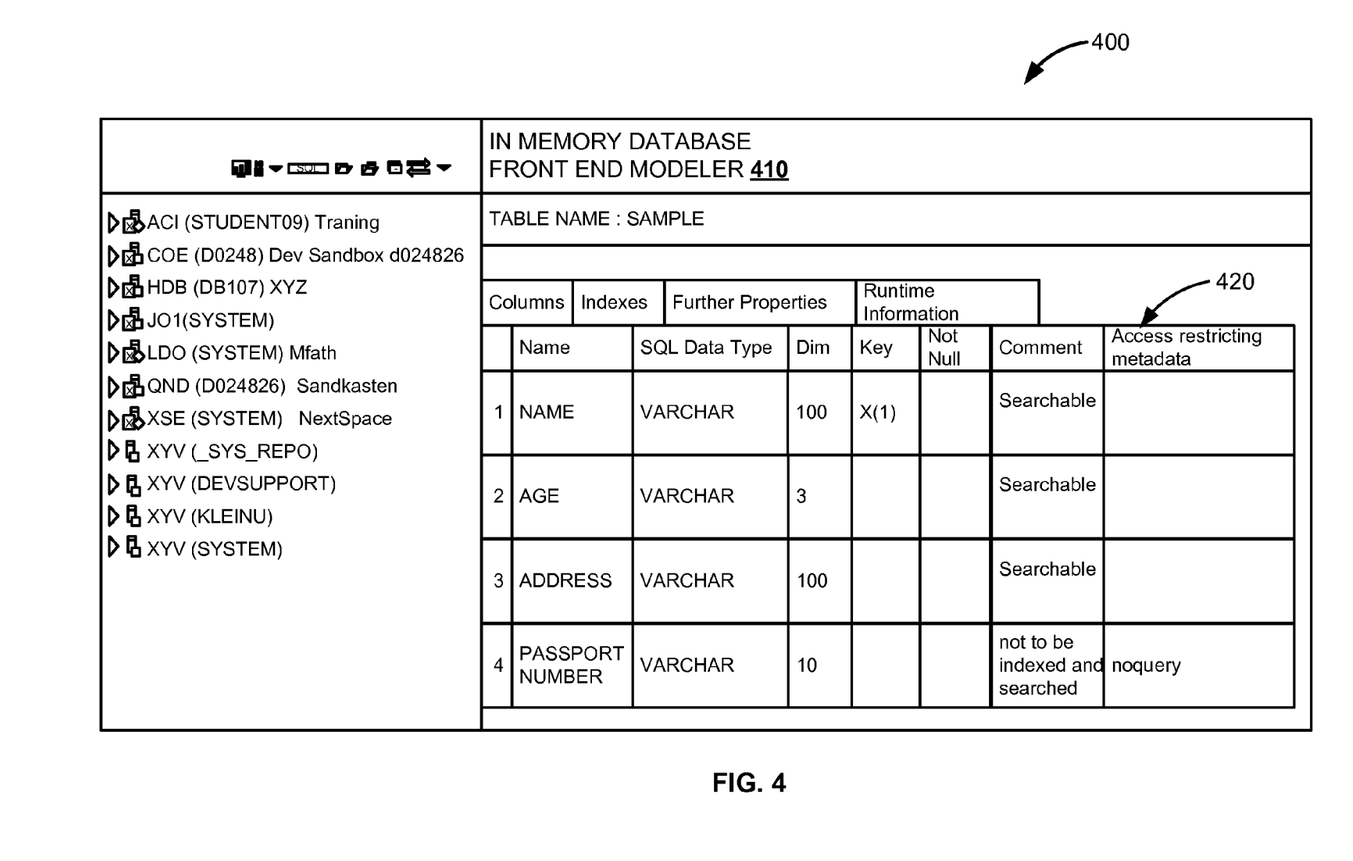
FIG. 4 is a block diagram illustrating a user interface for visualizing protected columns specified with access restricting metadata, according to one embodiment.

FIG. 4 is a block diagram illustrating user interface 400 for visualizing protected columns specified with access restricting metadata, according to one embodiment. In front end modeler 410 of in-memory database, information in table 'SAMPLE' is displayed with columns such as 'NAME', 'AGE', 'ADDRESS' and 'PASSPORT_NUMBER'. A data type and other parameters associated with column attributes are also displayed in the front end modeler 410. Since 'PASSPORT_NUMBER' is a protected column, it is specified with an access restricting metadata. This access restricting metadata is displayed in access restricting metadata column attribute 420. Thus, user can visualize the protected columns associated with the tables in the user interface associated with the front end modeler 410. Additionally, in comments section 425, it can also be indicated that protected column 'PASSPORT_NUMBER' is not to be indexed and searched.

Figure 5:
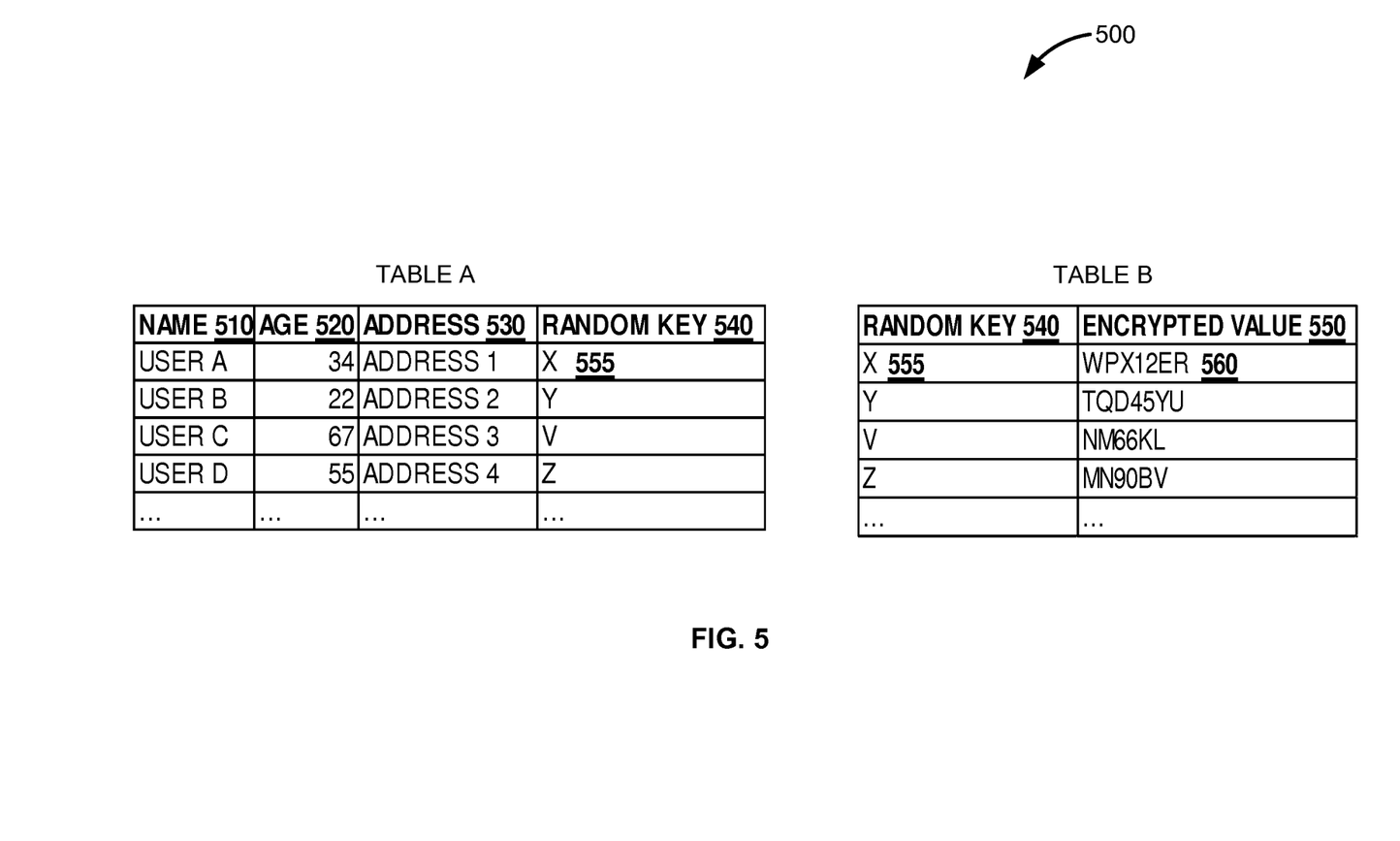
FIG. 5 shows a set of dedicated tables illustrating additional privacy restrictions for columnar storage, according to one embodiment.

FIG. 5 shows set 500 of dedicated tables illustrating additional privacy restrictions for columnar storage, according to one embodiment. Consider an example of table named 'SAMPLE' in FIG. 1 that includes columns 'NAME', 'AGE', 'ADDRESS' and 'PASSPORT_NUMBER'. The protected column 'PASSPORT_NUMBER' 140 of FIG. 1 is split into two columns 'RANDOM KEY' column and 'ENCRYPTED VALUE' column. The table 'SAMPLE' is stored in set 500 of dedicated tables 'TABLE A' and 'TABLE B'. The first table 'TABLE A' includes columns 'NAME' 510, 'AGE' 520, 'ADDRESS' 530 and 'RANDOM KEY' 540, and the second table 'TABLE B' includes columns 'RANDOM KEY' 540 and 'ENCRYPTED VALUE' 550. The 'RANDOM KEY' 540 column includes random key values, these random key values are used to encrypt the passport numbers, and generate encrypted values in the 'ENCRYPTED VALUE' 550 column.

Encryption is performed using any encryption function such as "Encrypt (Random_key, passport_number)=encrypted_value". This "Encrypt" function is merely exemplary, any encryption function using any encryption algorithms can be used. The random_key and passport_number is sent as input parameters to the encrypt function, and this results in the encrypted value. For example, consider 'USER A' with passport_number '34886544' as shown in FIG. 1, and random_key 'x' 555. This passport_number '34886544' and random_key 'x' are sent as input parameters to the encrypt function "Encrypt (x, 34886544)", and the encrypted value 'WPX12ER' 560 is obtained. This encrypted value 'WPX12ER' 560 is stored in the 'ENCRYPTED VALUE' 550 column in 'TABLE B'. To retrieve the passport numbers, the encrypted values are decrypted using any decryption function such as "Decrypt (Random_key [name], encrypted_value)=passport_number". For example, consider the random_key 'x' 555 and encrypted_value 'WPX12ER'. The encrypted_value 'WPX12ER' and the random_key 'x' are sent as input parameters to the decrypt function Decrypt (x, WPX12ER), and the passport_number '34886544' is obtained.

Random_key [name] is used to determine the user associated with the random key, in this case based on the random_key 'x' 555, 'USER A' is determined. This method of encrypting the values in the protected column, and splitting, and storing in dedicated tables, restricts the protected column from being searched and processed. In one embodiment, the encryption and decryption function are available as stored procedures. These stored procedures can be restricted to single record processing so that no more than one record associated with protected column can be processed at a given point of time. In this way, data associated with protected column can be automatically restricted from generic data browsing and data retrieval.

In one embodiment, the techniques of using access restricting metadata on the protected column, and encrypting the value of protected column and storing in dedicated tables are used in combination to ensure maximum privacy protection in a columnar storage. First, the protected column is split into two columns 'RANDOM KEY' column and 'ENCRYPTED VALUES' column Second, the 'ENCRYPTED VALUES' column is specified with an access restricting metadata to restrict selection or any operation on the protected column specifically 'ENCRYPTED VALUES' column. The 'RANDOM KEY' column is stored in a first table, and the 'RANDOM KEY' column and 'ENCRYPTED VALUES' column is stored in a second table. When these two techniques are used in combination, maximum privacy protection in ensured for protected columns in database storage.

Figure 6:
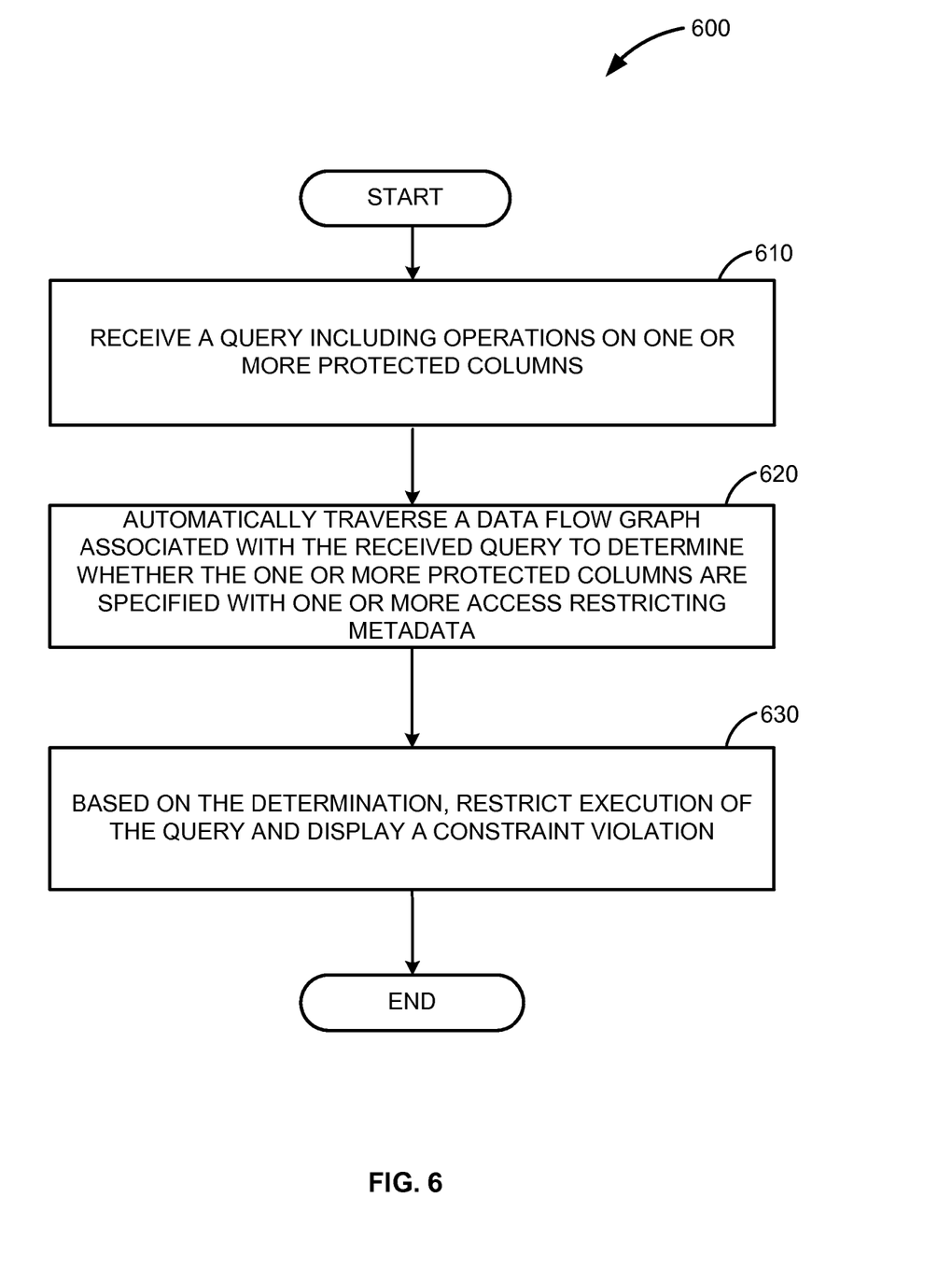
FIG. 6 is a flow diagram illustrating a process of privacy restrictions in columnar storage, according to one embodiment.

FIG. 6 is a flow diagram illustrating process 600 of privacy restrictions in columnar storage, according to one embodiment. At 610, a query including operations on one or more protected columns is received. The one or more protected columns are specified with one or more access restricting metadata in a columnar table. At 620, a data flow graph associated with the received query is traversed to determine whether the one or more protected columns are specified with one or more access restricting metadata. At 630, the query execution is restricted and a constraint violation is displayed based on the determination.

Figure 7:
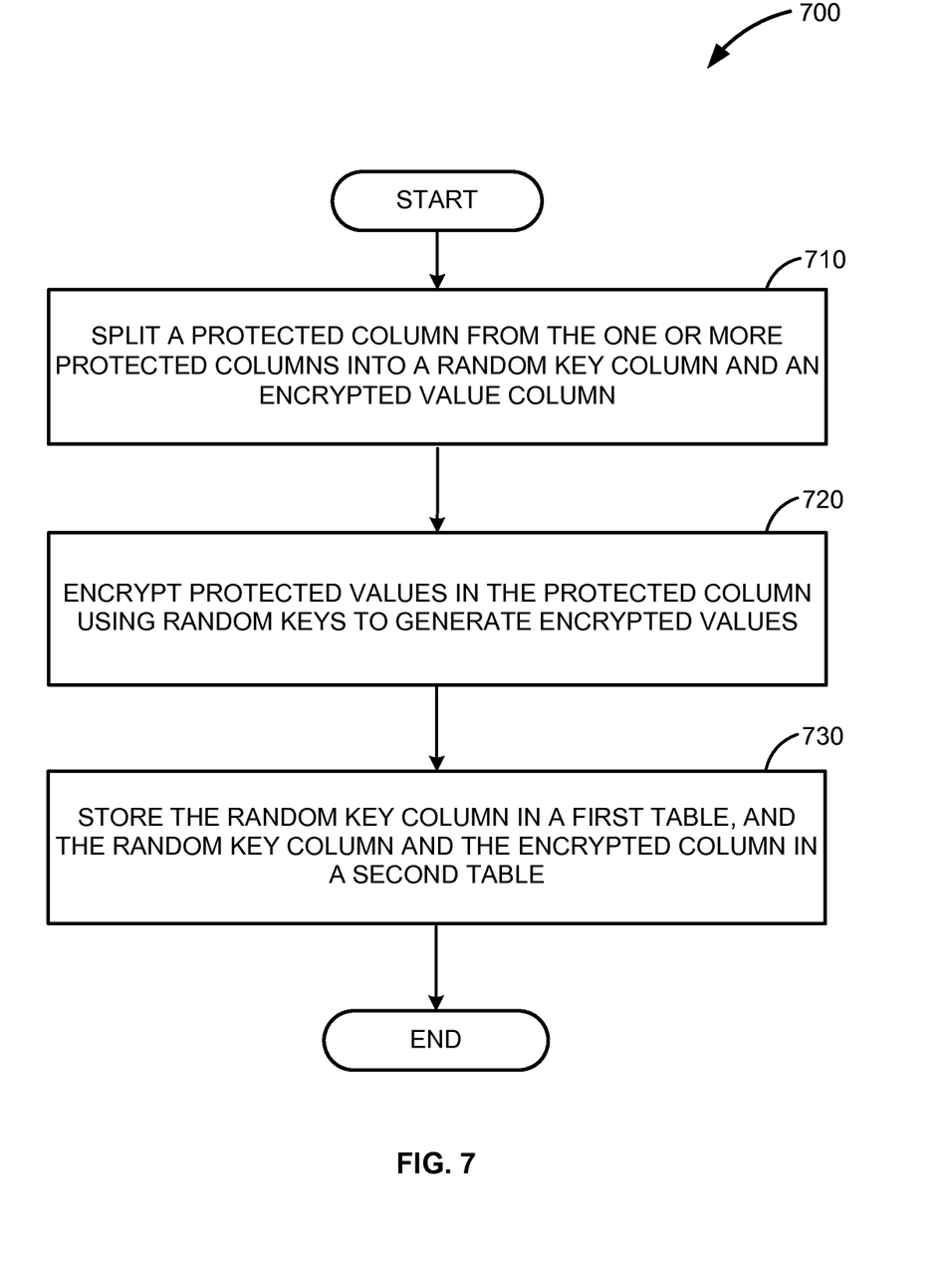
FIG. 7 is a flow diagram illustrating a process of using dedicated tables for privacy restrictions in columnar storage, according to one embodiment.

FIG. 7 is a flow diagram illustrating process 700 of using dedicated tables for additional privacy restrictions in columnar storage, according to one embodiment. At 710, a protected column from one or more protected columns is split into a random key column and an encrypted value column. The random key column includes random keys and the encrypted value column includes encrypted values. At 720, protected values in the protected column are encrypted using random keys to generate encrypted values. At 730, the random key column is stored in a first table and the random key column and the encrypted value column are stored in a second table.

The various embodiments described above have a number of advantages. Using a data flow graph to determine whether a protected column is accessed in a complex query is efficient and quick. Before the execution of the complex query begins, it can be determined whether any protected column is being accessed by any operation. Further, encrypting and storing the values of protected column does not allow any operation on the protected column, ensuring additional privacy protection. Implementation of these two techniques in columnar storage provides maximum privacy restriction in columnar storage.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
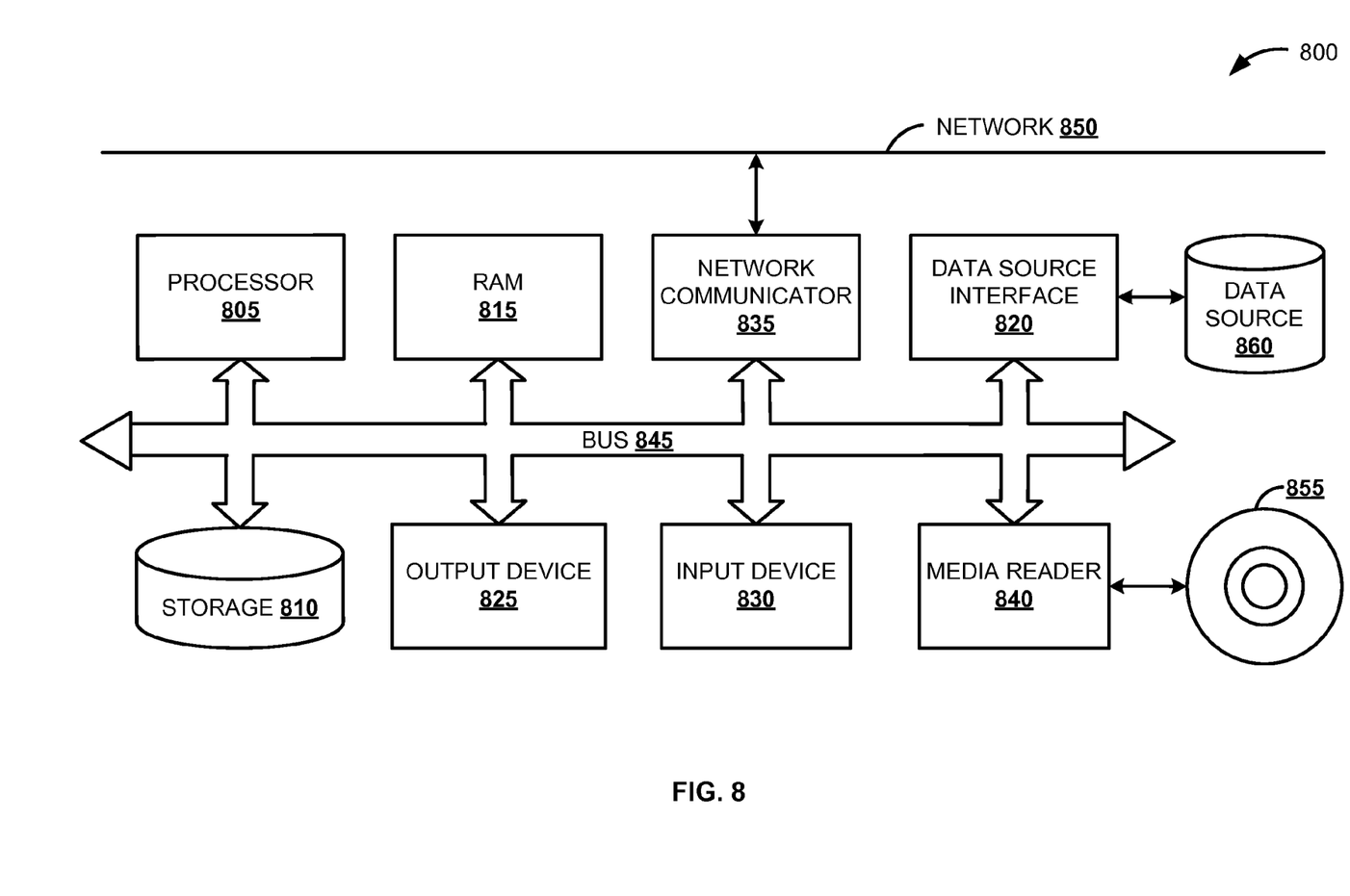
FIG. 8 is a block diagram illustrating an exemplary computer system, according to one embodiment.

FIG. 8 is a block diagram illustrating an exemplary computer system 800, according to one embodiment. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:

split a protected column into a random key column comprising random keys and an encrypted value column comprising encrypted values, wherein the encrypted value column of the protected column is specified with access restricting metadata;

store the random keys in the random key column in a first columnar table;

store the random keys in the random key column and the encrypted values in the encrypted value column in a second columnar table in consecutive memory locations;

determine whether the received query comprises operations on the encrypted value column specified with the access restricting metadata; and based on the determination, restrict execution of the query and display a constraint violation.

2. The computer-readable medium of claim 1, further comprising instructions which when executed by the computer further causes the computer to:

encrypt protected values in the protected column using random keys to generate encrypted values.

3. The computer-readable medium of claim 2, further comprising instructions which when executed by the computer further causes the computer to:

decrypt the encrypted values using random keys to retrieve the protected values in the protected column.

4. The computer-readable medium of claim 1, further comprising instructions which when executed by the computer further causes the computer to:

receive a query comprising operations to alter the one or more protected columns to remove the specified one or more access restricting metadata; and in response to the received query, automatically log in an audit file and notify a security violation.

5. The computer-readable medium of claim 1, further comprising instructions which when executed by the computer further causes the computer to:

automatically traverse a data flow graph associated with the received query to determine whether the one or more protected columns are specified with the one or more access restricting metadata.

6. The computer-readable medium of claim 1, further comprising instructions which when executed by the computer further causes the computer to:

receive a query on a database view corresponding to the columnar table, wherein the query comprising operations on one or more protected columns specified with one or more access restricting metadata; and based on the determination, restrict execution of the query and display a constraint violation.

7. A computer-implemented method of privacy restrictions for columnar storage, the method comprising:

splitting a protected column into a random key column comprising random keys and an encrypted value column comprising encrypted values, wherein the encrypted value column of the protected column is specified with access restricting metadata;

storing the random keys in the random key column in a first columnar table;

storing the random keys in the random key column and the encrypted values in the encrypted value column in a second columnar table in consecutive memory locations;

determining whether the received query comprises operations on the encrypted value column specified with the access restricting metadata; and based on the determination, restricting execution of the query and display a constraint violation.

8. The method of claim 7, further comprising:
encrypting protected values in the protected column using random keys to generate encrypted values.

9. The method of claim 8, further comprising:
decrypting the encrypted values using random keys to retrieve the protected values in the protected column.

10. The method of claim 7, further comprising:
receiving a query comprising operations to alter the one or more protected columns to remove the specified one or more access restricting metadata; and
in response to the received query, automatically logging in an audit file and notifying a security violation.

11. The method of claim 7, further comprising:
automatically traversing a data flow graph associated with the received query to detect whether the one or more protected columns are specified with the one or more access restricting metadata.

12. The method of claim 7, further comprising:
receiving a query on a database view corresponding to the columnar table, wherein the query comprising operations on one or more protected columns specified with one or more access restricting metadata;
determine whether the received query comprises operations on the one or more protected columns specified with the one or more access restricting metadata; and
based on the determination, restricting execution of the query and display a constraint violation.

13. A computer system for privacy restrictions for columnar storage, comprising:
a computer memory to store program code; and
a processor to execute the program code to:
split a protected column into a random key column comprising random keys and an encrypted value column comprising encrypted values, wherein the encrypted value column of the protected column is specified with access restricting metadata;
store the random keys in the random key column in a first columnar table;
store the random keys in the random key column and the encrypted values in the encrypted value column in a second columnar table in consecutive memory locations;
determine whether the received query comprises operations on the encrypted value column specified with the access restricting metadata; and
based on the determination, restrict execution of the query and display a constraint violation.

14. The system of claim 13, wherein the processor further executes the program code to:
encrypt protected values in the protected column using random keys to generate encrypted values.

15. The system of claim 14, wherein the processor further executes the program code to:
decrypt the encrypted values using random keys to retrieve the protected values in the protected column.

16. The system of claim 13, wherein the processor further executes the program code to:
automatically traverse a data flow graph associated with the received query to detect whether the one or more protected columns are specified with the one or more access restricting metadata.

17. The system of claim 13, wherein the processor further executes the program code to:
receive a query on a database view corresponding to the columnar table, wherein the query comprising operations on one or more protected columns specified with one or more access restricting metadata;
determine whether the received query comprises operations on the one or more protected columns specified with the one or more access restricting metadata; and
based on the determination, restrict execution of the query and display a constraint violation.

18. The system of claim 13, wherein the processor further executes the program code to:
receive a query comprising operations to alter the one or more protected columns to remove the specified one or more access restricting metadata; and
in response to the received query, automatically log in an audit file and notify a security violation.

* * * * *